US009956984B2

(12) United States Patent
Yoshimura

(10) Patent No.: US 9,956,984 B2
(45) Date of Patent: May 1, 2018

(54) STEERING SYSTEM

(71) Applicant: JTEKT CORPORATION, Osaka-shi, Osaka (JP)

(72) Inventor: Satoki Yoshimura, Shiki-Gun (JP)

(73) Assignee: JTEKT CORPORATION, Osaka (JP)

( * ) Notice: Subject to any disclaimer, the term of this patent is extended or adjusted under 35 U.S.C. 154(b) by 0 days. days.

(21) Appl. No.: 15/493,933

(22) Filed: Apr. 21, 2017

(65) Prior Publication Data
US 2017/0313344 A1    Nov. 2, 2017

(30) Foreign Application Priority Data
Apr. 28, 2016 (JP) ................. 2016-091678

(51) Int. Cl.
*B62D 1/184* (2006.01)
*B62D 1/185* (2006.01)
*B62D 1/187* (2006.01)

(52) U.S. Cl.
CPC ............. *B62D 1/184* (2013.01); *B62D 1/185* (2013.01); *B62D 1/187* (2013.01)

(58) Field of Classification Search
CPC ......... B62D 1/184; B62D 1/187; B62D 1/185
See application file for complete search history.

(56) References Cited

U.S. PATENT DOCUMENTS

2008/0252056 A1* 10/2008 Moriyama ............ B62D 1/184
280/775
2013/0213174 A1* 8/2013 Suzuki ................. B62D 1/184
74/493
2015/0107398 A1* 4/2015 Nagasawa ............ B22D 17/00
74/493
2016/0244087 A1* 8/2016 Sakuda ................. B62D 1/184
2016/0318541 A1* 11/2016 Mihara ................. B62D 1/184

FOREIGN PATENT DOCUMENTS

| JP | 2007-223383 A | 9/2007 |
| WO | 2005/037627 A1 | 4/2005 |
| WO | 2015/133017 A1 | 9/2015 |

OTHER PUBLICATIONS

Sep. 6, 2017 Search Report issued in European Patent Application No. 17168035.8.

* cited by examiner

*Primary Examiner* — James A English
(74) *Attorney, Agent, or Firm* — Oliff PLC

(57) ABSTRACT

A column jacket includes a pair of facing portions facing each other, and a stepped portion which extends in a direction that intersects with a column axial direction and at which an outer surface of the corresponding facing portion projects outward halfway toward an end side of the column jacket. Tilt grooves are formed in respective side plates of an upper bracket fixed to a vehicle body. A clamping mechanism including a clamping shaft inserted through the tilt grooves clamps the side plates to bend the side plates such that an end of each side plate on the extending direction upper side is displaced toward the corresponding facing portion. The stepped portion is located between a fulcrum portion serving as a fulcrum when the corresponding side plate is bent by being clamped by the clamping mechanism and the corresponding tilt groove, in an extending direction of the side plates.

4 Claims, 8 Drawing Sheets

STEERING SYSTEM

INCORPORATION BY REFERENCE

The disclosure of Japanese Patent Application No. 2016-091678 filed on Apr. 28, 2016 including the specification, drawings and abstract, is incorporated herein by reference in its entirety.

BACKGROUND OF THE INVENTION

1. Field of the Invention

The invention relates to a steering system.

2. Description of the Related Art

There is known a steering system that improves the rigidity against vibration (vibration rigidity) by clamping a bracket that is attached to the vehicle body and thereby bringing an outer column and the bracket into contact with each other. For example, in an electric power steering system disclosed in Japanese Patent Application Publication No. 2007-223383 (JP 2007-223383 A), an outer column has contact surfaces extending from its end face on the front side of the vehicle body toward the rear of the vehicle body. In this electric power steering system, a clamping rod inserted through elongated tilt grooves formed in respective right and left side plates of a bracket extending downward is tightened such that the contact surfaces are brought into contact with the inner surfaces of the side plates. Thus, the outer column and the bracket are brought into contact with each other.

In a steering system disclosed in WO2005/037627 Pamphlet, a pair of plate parts of a bracket extends in the axial direction of a steering shaft. A fixing member is inserted through tilt grooves formed in the respective plate parts. The fixing member fixes a column holding member to the plate parts by displacing the plate parts. In each plate part, the center line in the direction in which the tilt groove extends is substantially parallel to the bending center line of the plate part. Accordingly, there is little change between the force that bends the plate parts when the fixing member is located at the uppermost ends of the tilt grooves and the force that bends the plate parts when the fixing member is located at the lowermost ends of the tilt grooves.

In the electric power steering system disclosed in JP 2007-223383 A, the clamping rod is inserted through the elongated tilt grooves formed in the respective side plates extending downward. Therefore, the force (clamping force) of the clamping rod clamping the side plates tends to vary in accordance with the position of the clamping rod in the elongated tilt grooves, so that the clamping force tends to be unstable. In the steering system disclosed in WO2005/037627 Pamphlet, the fixing member clamps the plate parts, and thereby bends the plate parts such that distal end portions of the plate parts in the axial direction of the steering shaft come closer to each other. Then, a portion of each plate part around the bending center line having a relatively high rigidity does not come into contact with the column holding member, and only the distal end portion of each plate part having a relatively low rigidity comes into contact with the column holding member. Therefore, the plate parts cannot firmly hold the column holding member, which might result in a reduction in vibration rigidity (reduction in resonance frequency).

SUMMARY OF THE INVENTION

One object of the present invention is to provide a steering system with a stable clamping force and an improved vibration rigidity.

According to an aspect of the present invention, there is provided a steering system that includes: a column jacket pivotable in a tilt direction, the column jacket including a pair of facing portions protruding from an outer peripheral portion of the column jacket and facing each other, and a stepped portion which extends in an intersecting direction with respect to an axial direction of the column jacket and at which an outer surface of a corresponding one of the facing portions projects outward halfway from a first end side to a second end side of the column jacket in the axial direction; a bracket fixed to a vehicle body, the bracket including a pair of side plates disposed on outer sides of the respective facing portions and extending to the first end side to intersect with the tilt direction, and tilt grooves formed in the respective side plates and extending in the tilt direction; and a clamping mechanism that clamps the side plates to bend the side plates such that an end of each of the side plates on the first end side is displaced toward a corresponding one of the facing portions, the clamping mechanism including a clamping shaft that is inserted through the tilt grooves to move in the tilt direction in the tilt grooves when the column jacket pivots in the tilt direction; wherein the stepped portion is located between a portion serving as a fulcrum when a corresponding one of the side plates is bent by being clamped by the clamping mechanism and a corresponding one of the tilt grooves, in a direction in which the side plates extend.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
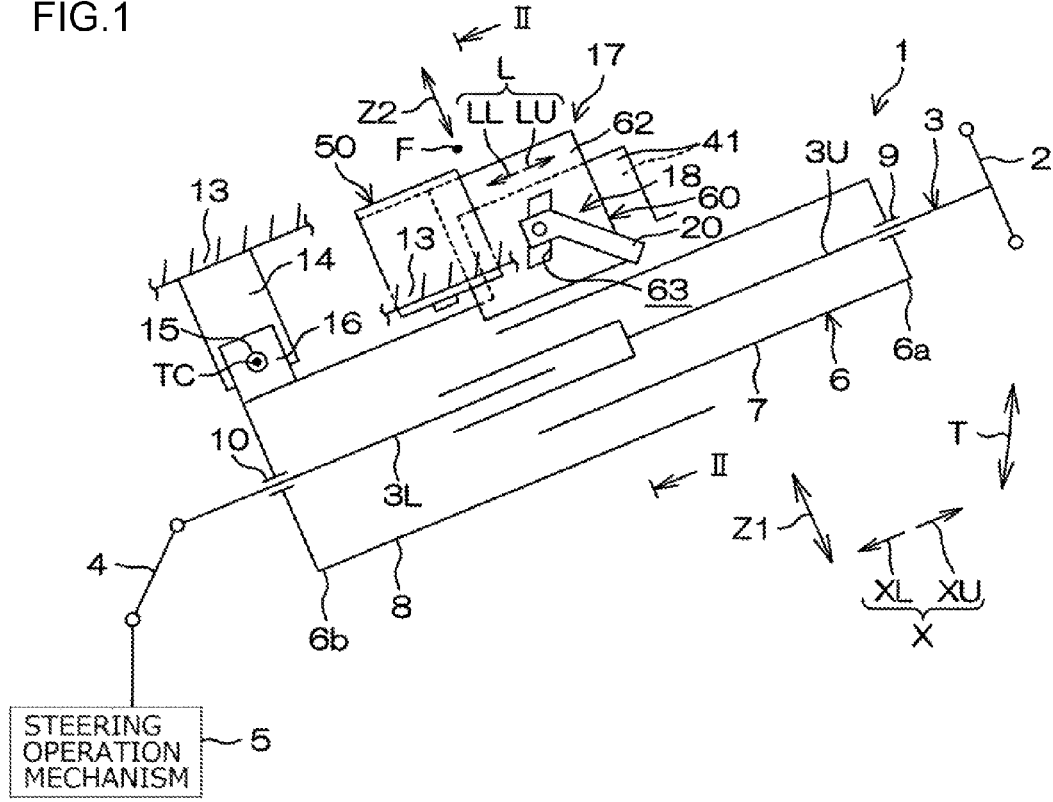
FIG. 1 is a schematic side view illustrating a steering system according to an embodiment of the present invention.

Hereinafter, embodiments of the present invention will be described in detail with reference to the accompanying drawings. FIG. 1 is a schematic side view illustrating a steering system 1 according to an embodiment of the present invention. Referring to FIG. 1, the steering system 1 includes a steering shaft 3, a cylindrical column jacket 6, an intermediate shaft 4, and a steering operation mechanism 5. An end (axially upper end) of the steering shaft 3 is coupled to a steering member 2 such as a steering wheel. The steering system 1 turns steered wheels (not illustrated) in accordance with steering of the steering member 2. The steering operation mechanism 5 may be, for example, but not limited to, a rack-and-pinion mechanism.

The upper side in a column axial direction X that is the axial direction of the steering shaft 3 is hereinafter referred to as an axially upper side XU, and the lower side in the column axial direction X is hereinafter referred to as an axially lower side XL. The steering shaft 3 includes a cylindrical upper shaft 3U and a lower shaft 3L. The upper shaft 3U and the lower shaft 3L are fitted together by, for example, spline fitting or serration fitting so as to be movable relative to each other.

The column jacket 6 includes a cylindrical inner jacket 7 and a cylindrical outer jacket 8. One end of the inner jacket 7 is connected to the steering member 2 via the upper shaft 3U. The outer jacket 8 is externally fitted to the inner jacket 7. The outer jacket 8 is a lower jacket slidably fitted to the other end of the inner jacket 7. The inner jacket 7 is an upper jacket disposed on the axially upper side XU of the outer jacket 8. The column axial direction X coincides with the axial direction of the column jacket 6. The column jacket 6 has a first end 6a on the steering member 2 side (upper rear of the vehicle) and a second end 6b on the side (lower front of the vehicle) opposite to the steering member 2 side. The axially upper side XU coincides with the first end 6a side in the axial direction of the column jacket 6. The axially lower side XL coincides with the second end 6b side in the axial direction of the column jacket 6. The first end 6a side of the column jacket 6 is hereinafter simply referred to as a "first end 6a side", and the second end 6b side of the column jacket 6 is hereinafter simply referred to as a "second end 6b side.

The steering shaft 3 is inserted through the column jacket 6. The upper shaft 3U is rotatably supported by the inner jacket 7 via a bearing 9. The lower shaft 3L is rotatably supported by the outer jacket 8 via a bearing 10. The upper shaft 3U slides in the column axial direction X with respect to the lower shaft 3L. Thus, the column jacket 6 can be telescopically extended and retracted in the column axial direction X, together with the steering shaft 3.

The position of the steering member 2 can be adjusted in the front-rear direction of the vehicle by telescopically extending or retracting the steering shaft 3 and the column jacket 6 in the column axial direction X. That is, the steering system 1 has a telescopic adjustment function. The steering system 1 includes a fixed bracket 14, a tilt center shaft 15, and a column bracket 16. The fixed bracket 14 is fixed to a vehicle body 13. The tilt center shaft 15 is supported by the fixed bracket 14. The column bracket 16 is fixed to the outer periphery of the outer jacket 8 and rotatably supported by the tilt center shaft 15. The fixed bracket 14 supports the column jacket 6 together with the steering shaft 3 so that the column jacket 6 is pivotable in a tilt direction T about the other end side of the steering shaft 3. More specifically, the column jacket 6 is pivoted about a tilt center TC that is the central axis of the tilt center shaft 15 disposed in the vicinity of the other end of the steering shaft 3.

The position of the steering member 2 can be adjusted in the height direction by pivoting the steering shaft 3 and the column jacket 6 about the tilt center TC. That is, the steering system 1 has a tilt adjustment function. The steering system 1 includes an upper bracket 17 and a clamping mechanism 18. The upper bracket 17 is fixed to the vehicle body 13. The clamping mechanism 18 locks the position after tilt adjustment and telescopic adjustment. The clamping mechanism 18 achieves locking by clamping, via the upper bracket 17, a pair of facing portions 41 provided integrally with an upper portion of the outer jacket 8 in the column axial direction X.

Figure 2:
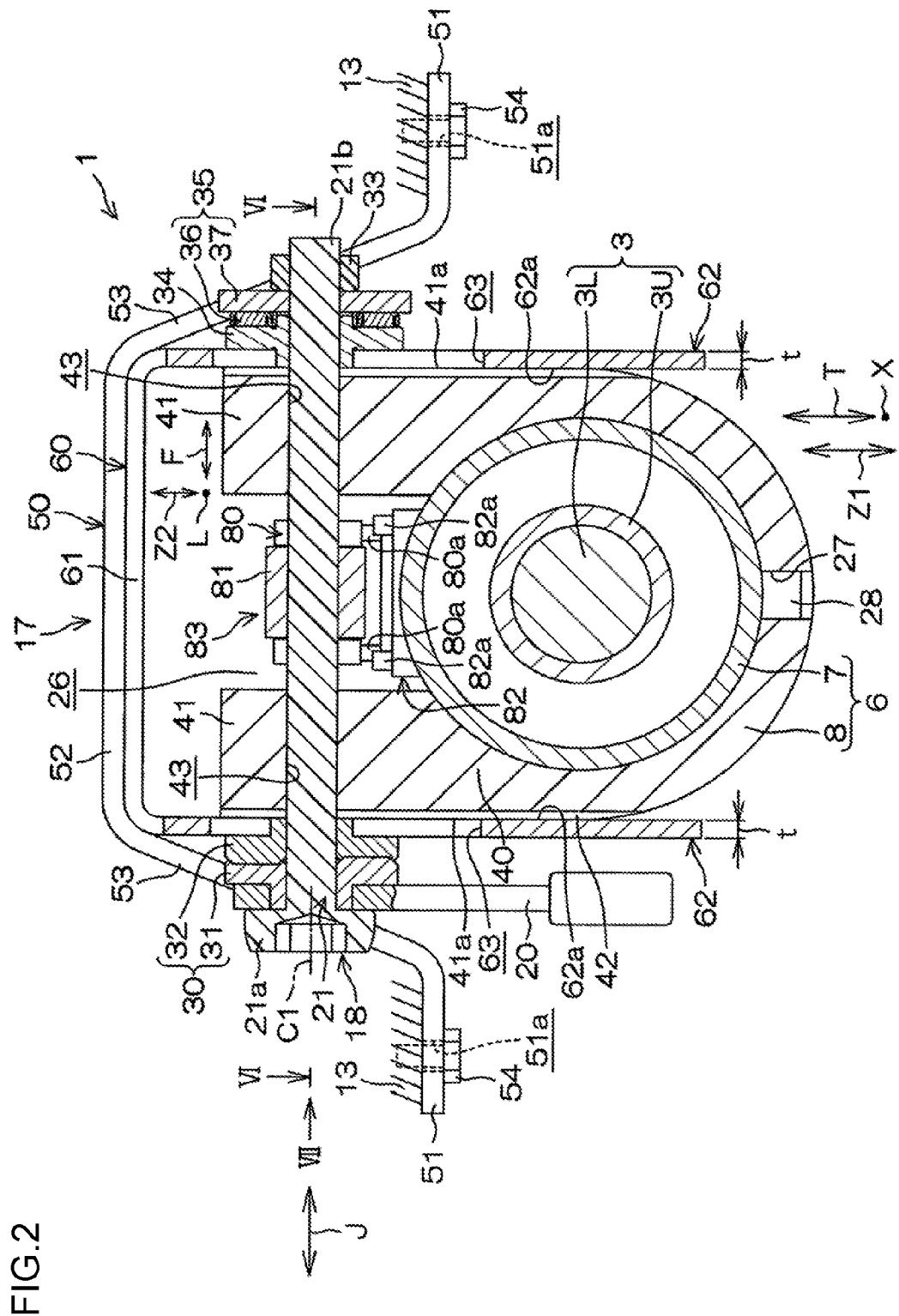
FIG. 2 is a schematic cross-sectional view illustrating the steering system taken along the line II-II in FIG. 1.

FIG. 2 is a schematic cross-sectional view illustrating the steering system 1 taken along the line II-II in FIG. 1. The outer jacket 8 includes the pair of facing portions 41, a slit 26, and a pair of stepped portions 42. The facing portions 41 protrude from an outer peripheral portion 40 and face each other. The slit 26 extends from the upper end of the outer jacket 8 in the column axial direction X to the axially lower side XL. Each stepped portion 42 is disposed on an outer surface 41a of the corresponding facing portion 41, and extends in an intersecting direction Z1 with respect to the column axial direction X. The outer peripheral portion 40 is a part of the outer periphery of the column jacket 6. The direction in which the facing portions 41 face each other is referred to as a facing direction F. The intersecting direction Z1 is a direction substantially orthogonal to the column axial direction X and the facing direction F, and is substantially the vertical direction of the vehicle. When tilt adjustment is performed, the column axial direction X and the intersecting direction Z1 vary in accordance with the position of the column jacket 6 (the inclination of the column jacket 6) after tilt adjustment. The facing portions 41 are disposed on the opposite sides of the slit 26 in the facing direction F. The outer jacket 8 can be elastically reduced in diameter by clamping the facing portions 41 toward each other with the clamping mechanism 18.

The upper bracket 17 is a member that is formed by fixing two bent metal plate members to each other by welding or the like. More specifically, the upper bracket 17 includes an attachment part 50 and an elastic deformation part 60. The attachment part 50 is attached to the vehicle body 13. The elastic deformation part 60 is elastically deformed by being clamped by the clamping mechanism 18. The elastic deformation part 60 includes, as integral parts, a supported plate 61 and a pair of side plates 62. The supported plate 61 is supported by the attachment part 50. The side plates 62 extend from the opposite ends of the supported plate 61 in the facing direction F to the first end 6a side to intersect with the tilt direction T.

The direction in which the side plates 62 extend is referred to as an extending direction L (see also FIG. 1). The extending direction L is a direction extending from the lower front to the upper rear of the vehicle. The extending direction L is a direction substantially orthogonal to the facing direction F, and is a direction intersecting with the tilt direction T. The first end 6a side in the extending direction L is hereinafter referred to as an extending direction upper side LU, and the second end 6b side in the extending direction L is hereinafter referred to as an extending direction lower side LL. A direction intersecting with the extending direction L, orthogonal to the facing direction F, and extending substantially in the vertical direction of the vehicle is referred to as a vertical direction Z2. The extending direction L and the vertical direction Z2 are constant regardless of the position of the column jacket 6 after tilt adjustment. Depending on the position of the column jacket 6 after tilt adjustment, the extending direction L and the column axial direction X may coincide with each other, and the intersecting direction Z1 and the vertical direction Z2 may coincide with each other. The side plates 62 may be symmetric with respect to a plane perpendicular to the facing direction F. In this case, the side plates 62 have the same rigidity. The upper bracket 17 includes tilt grooves 63 formed in the respective side plates 62 and extending in the tilt direction T.

Each of the side plates 62 is disposed on the outer side of a corresponding one of the facing portions 41 in the facing direction F. Each of the facing portions 41 has a plate shape extending along an inner surface 62a of a corresponding one of the side plates 62. A circular insertion hole 43 is formed in each of the facing portions 41. A guide groove 27 extending in the column axial direction X is formed in the outer jacket 8. A guided projection 28 fixed to the inner jacket 7 is fitted in the guide groove 27. The guide groove 27 regulates rotation of the inner jacket 7 via the guided projection 28. Upon telescopic adjustment, an end (not illustrated) of the guide groove 27 on the axially upper side XU comes into contact with the guided projection 28, so that the inner jacket 7 is restricted from pulled out of the outer jacket 8.

The clamping mechanism 18 includes a clamping shaft 21 and an operation lever 20. The clamping shaft 21 has a central axis C1 extending in a clamping shaft direction J parallel to the facing direction F. The operation lever 20 is an operation member that rotates the clamping shaft 21. A central axis C1 of the clamping shaft 21 corresponds to the center of rotation of the operation lever 20. The clamping shaft 21 is a bolt, and is inserted through the tilt grooves 63 in the side plates 62 of the upper bracket 17 and through the insertion holes 43 in the facing portions 41 of the outer jacket 8. Upon tilt adjustment, the clamping shaft 21 moves in the tilt groove 63 in the tilt direction T.

A head portion 21a at one end of the clamping shaft 21 is fixed to the operation lever 20 so as to be rotatable therewith. The clamping mechanism 18 further includes a force conversion mechanism 30 that is interposed between the head portion 21a of the clamping shaft 21 and one of the side plates 62 (the side plate 62 on the left in FIG. 2) and converts an operation torque of the operation lever 20 into an axial force of the clamping shaft 21 (a clamping force for clamping the side plates 62). The force conversion mechanism 30 includes a rotation cam 31 and a first clamping member 32. The rotation cam 31 is coupled to the operation lever 20 so as to be rotatable therewith. Movement of the rotation cam 31 with respect to the clamping shaft 21 is regulated in the clamping shaft direction J. The first clamping member 32 cam-engages with the rotation cam 31 to press a corresponding one of the side plates 62. The first clamping member 32 is a non-rotation cam whose rotation is regulated.

The clamping mechanism 18 further includes a nut 33, a second clamping member 34, and an interposition member 35. The nut 33 is threaded on a threaded portion 21b at the other end of the clamping shaft 21. The second clamping member 34 presses the other side plate 62 (the side plate 62 at the right in FIG. 2). The interposition member 35 is interposed between the second clamping member 34 and the nut 33. The interposition member 35 includes a washer 36 and a needle roller bearing 37. The rotation cam 31, the first clamping member 32 (non-rotation cam), the second clamping member 34, and the interposition member 35 are supported by the outer periphery of the clamping shaft 21. The first clamping member 32 and the second clamping member 34 fit in the corresponding tilt grooves 63. This regulates rotation of the first clamping member 32 and the second clamping member 34.

When the operation lever 20 rotates in a locking direction, the rotation cam 31 rotates with respect to the first clamping member 32, the first clamping member 32 moves away from the rotation cam 31 in the clamping shaft direction J. Thus, the clamping members 32 and 34 clamp the side plates 62 of the upper bracket 17. Then, the side plates 62 of the upper bracket 17 clamp the corresponding facing portions 41 of the outer jacket 8. Accordingly, movement of the outer jacket 8 in the tilt direction T is regulated to achieve tilt locking. Since both the facing portions 41 are clamped, the outer jacket 8 is elastically reduced in diameter to clamp the inner jacket 7. Consequently, movement of the inner jacket 7 in the column axial direction X is regulated to achieve telescopic locking.

On the other hand, when the operation lever 20 rotates in a releasing direction, the first clamping member 32 moves toward the rotation cam 31 in the clamping shaft direction J along with rotation of the rotation cam 31. Thus, the side plates 62 are released from clamping by the clamping members 32 and 34. This allows tilt adjustment and telescopic adjustment. The steering system 1 further includes a telescopic locking mechanism 83 in order to stabilize initial restraint in a telescopic direction (column axial direction X) upon a secondary collision of a vehicle collision. The telescopic locking mechanism 83 includes a cylindrical lock member 80 and a lock plate 82 extending in the column axial direction X. The lock member 80, a transmission member 81, and the lock plate 82 are disposed between the facing portions 41 as viewed from the column axial direction X. The lock plate 82 is fixed to the inner jacket 7. The transmission member 81 includes a cam, a spring and the like. The cam transmits rotation of the clamping shaft 21 to the lock member 80. The spring urges the lock member 80 toward the lock plate 82.

Figure 3:
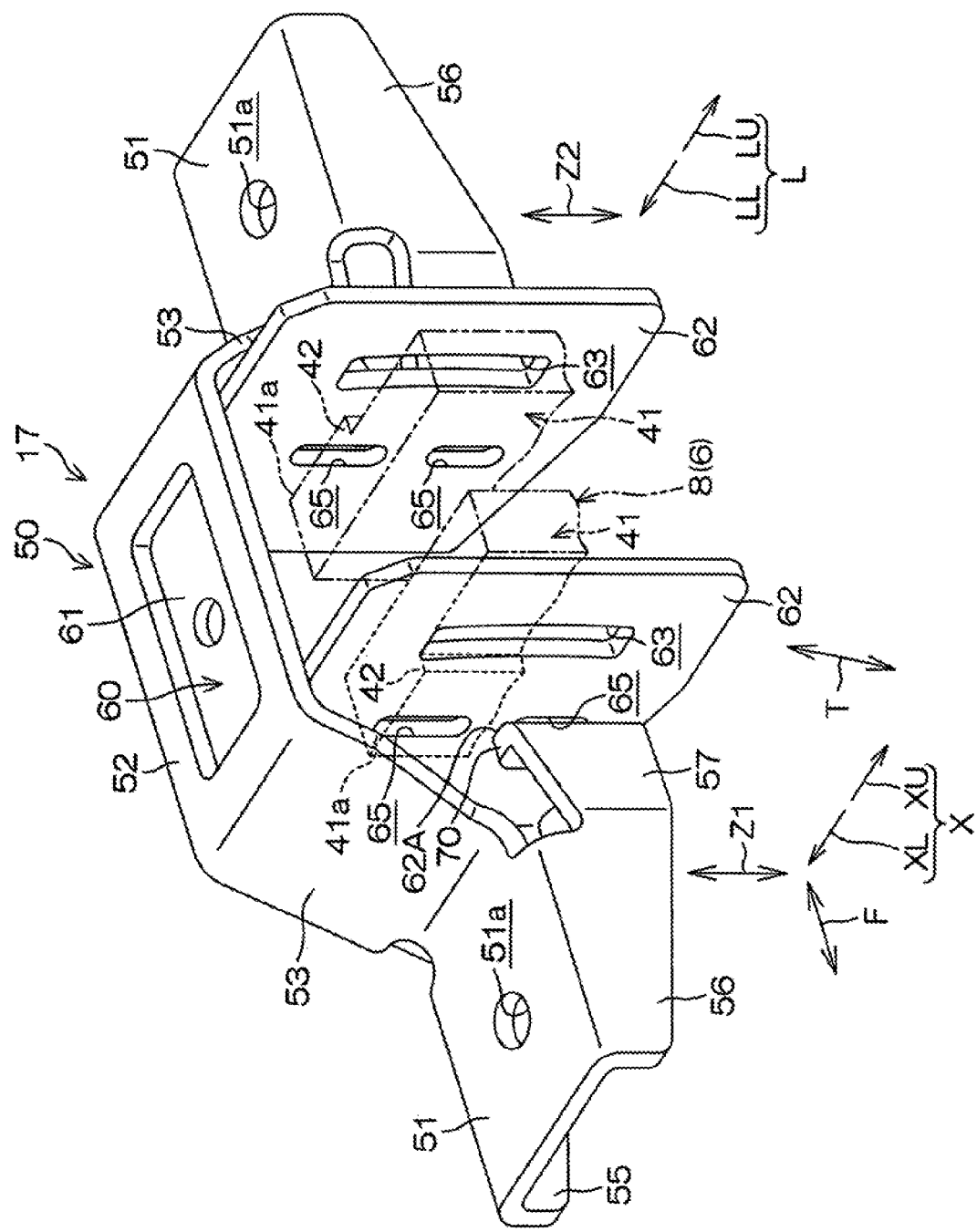
FIG. 3 is a perspective view illustrating an upper bracket according to the embodiment.
Figure 4:
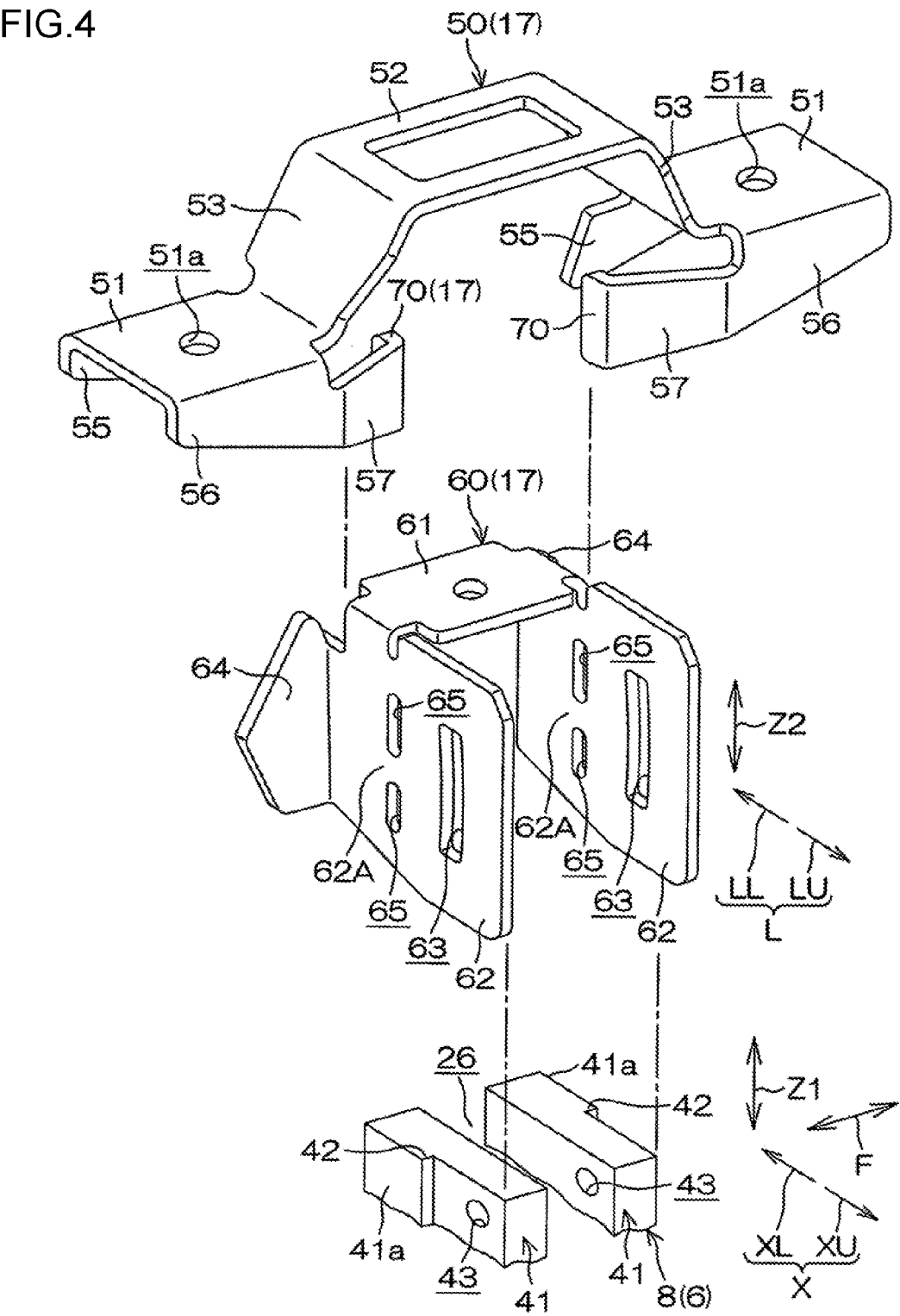
FIG. 4 is an exploded perspective view illustrating the upper bracket and the structure therearound.
Figure 5:
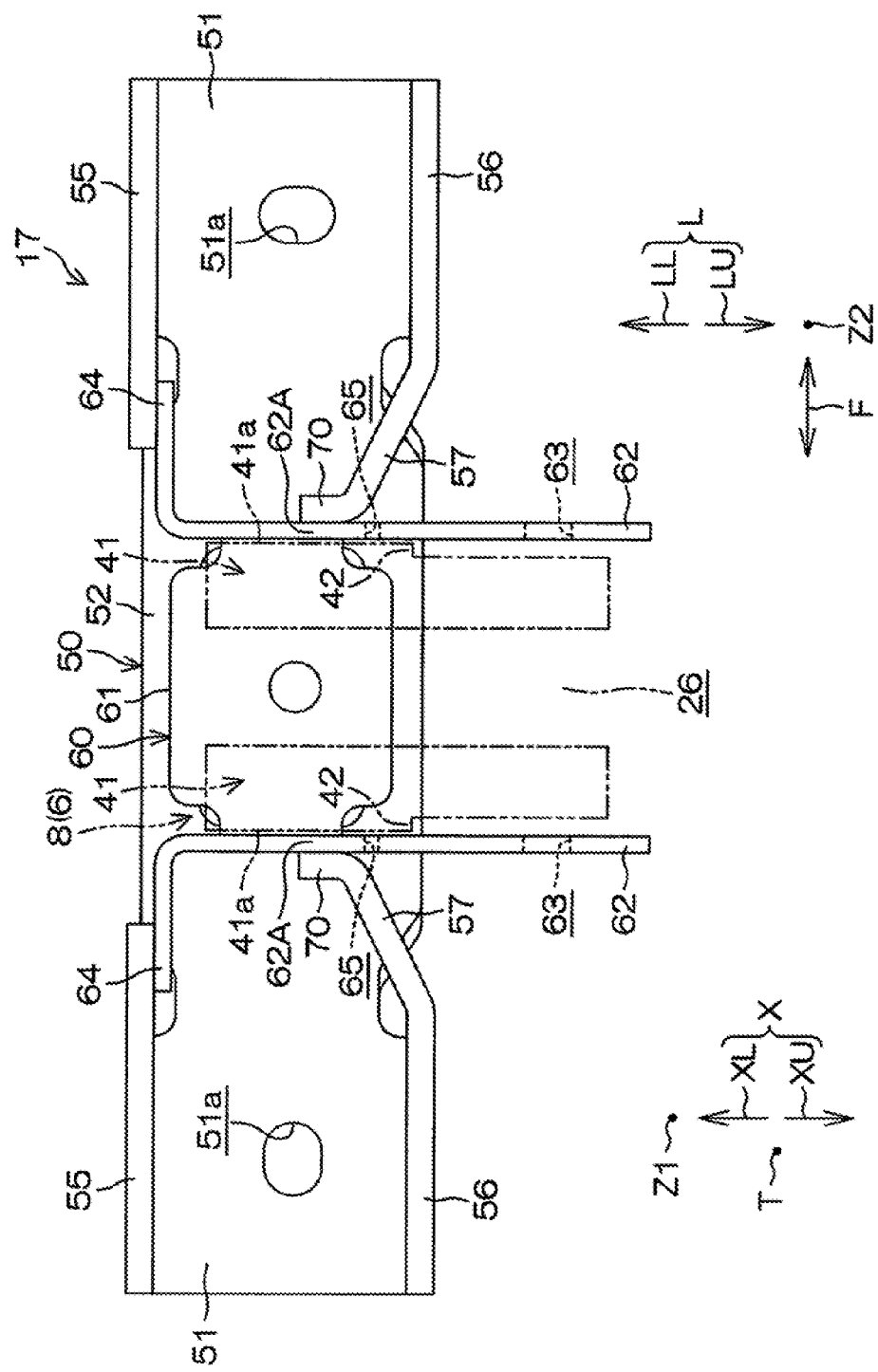
FIG. 5 is a bottom view illustrating the upper bracket.

When in a locked state, teeth 80a of the lock member 80 and teeth 82a of the lock plate 82 mesh with each other. Thus, the steering member 2 (see FIG. 1) is firmly locked in a position in the column axial direction X. In a released state, the meshing of the teeth 80a and the teeth 82a is released. Hereinafter, the configuration of the upper bracket 17 will be described in detail with reference to FIGS. 3 to 5. FIG. 3 is a perspective view illustrating the upper bracket 17. FIG. 4 is an exploded perspective view illustrating the upper bracket 17 and the structure therearound. FIG. 5 is a bottom view illustrating the upper bracket 17. In FIGS. 3 and 5, the outer jacket 8 is indicated by the long dashed double-short dashed line for explanation purposes.

Referring to FIGS. 3 and 4, the attachment part 50 is a member formed by, for example, bending a metal plate member. The attachment part 50 includes, as integral parts, a pair of fixing plates 51, a support plate 52, and a pair of coupling plates 53. The fixing plates 51 are fixed to the vehicle body 13 (see FIG. 2). The support plate 52 supports the elastic deformation part 60. Each of the coupling plates 53 couples a corresponding one of the fixing plates 51 to the support plate 52. The support plate 52 is disposed above the fixing plates 51 in the vertical direction Z2. The support plate 52 and the fixing plates 51 are flat in the facing direction F. The coupling plates 53 are inclined with respect to the facing direction F. A bolt insertion hole 51a for inserting a bolt 54 that fixes the attachment part 50 to the vehicle body 13 is formed at the substantial center of each fixing plate 51 (see also FIG. 2).

The attachment part 50 includes a pair of first declined plates 55 and a pair of second declined plates 56. Each of the first declined plates 55 extends downward in the vertical direction Z2 from an end of a corresponding one of the fixing plates 51 on the extending direction lower side LL. Each of the second declined plates 56 extends downward in the vertical direction Z2 from an end of a corresponding one of the fixing plates 51 on the extending direction upper side LU. The elastic deformation part 60 includes the supported plate 61, the pair of side plates 62, and a pair of projecting plates 64. Each of the projecting plates 64 projects from an end of the corresponding side plate 62 on the extending direction lower side LL to the outer side of the corresponding side plate 62 in the facing direction F. Each of the side plates 62 is supported at an upper end in the vertical direction Z2 of a portion thereof on the extending direction lower side LL by the supported plate 61. The supported plate 61 is fixed to the support plate 52 of the attachment part 50 by welding or the like.

Each stepped portion 42 causes the outer surface 41a of the corresponding facing portion 41 to project outward in the facing direction F, at a position halfway from an end of the facing portion 41 at the axially upper side XU to the axially lower side XL (see FIG. 5). The elastic deformation part 60 further includes rigidity reduction portions 65 that are located on the extending direction lower side LL with respect to the stepped portions 42 and reduce the rigidity of the side plates 62. Each rigidity reduction portion 65 includes, for example, two elongated holes that are elongated in the vertical direction Z2. The two elongated holes are disposed with a space therebetween in the vertical direction Z2. The rigidity reduction portions 65 do not necessarily have to be provided. Unlike the present embodiment, the rigidity reduction portion 65 may be provided in only one of the side plates 62.

Referring to FIG. 5, each of the projecting plates 64 faces the corresponding first declined plate 55. Each of the projecting plates 64 is fixed to the corresponding first declined plate 55 by welding or the like. The upper bracket 17 further includes a pair of reinforcing parts 70. Each of the reinforcing parts 70 is disposed at a portion 62A of the corresponding side plate 62 on the extending direction lower side LL with respect to the tilt groove 63 and reinforces the corresponding side plate 62. The portion 62A is a portion of each side plate 62 that is coupled to the attachment part 50 by the corresponding reinforcing part 70. The portion 62A is located on the extending direction lower side LL with respect to the rigidity reduction portion 65, and at the lower part of the side plate 62 in the vertical direction Z2.

Each reinforcing part 70 has the form of a rib extending in the vertical direction Z2. Each reinforcing part 70 faces the portion 62A. Each reinforcing part 70 is fixed to the portion 62A of the corresponding side plate 62 by welding or the like. Each reinforcing part 70 is supported by an extension plate 57 extending from the corresponding second declined plate 56. Each reinforcing part 70 serves also as a coupling part that couples the portion 62A of the corresponding side plate 62 on the extending direction lower side LL with respect to the tilt groove 63 to the attachment part 50.

Figure 6:
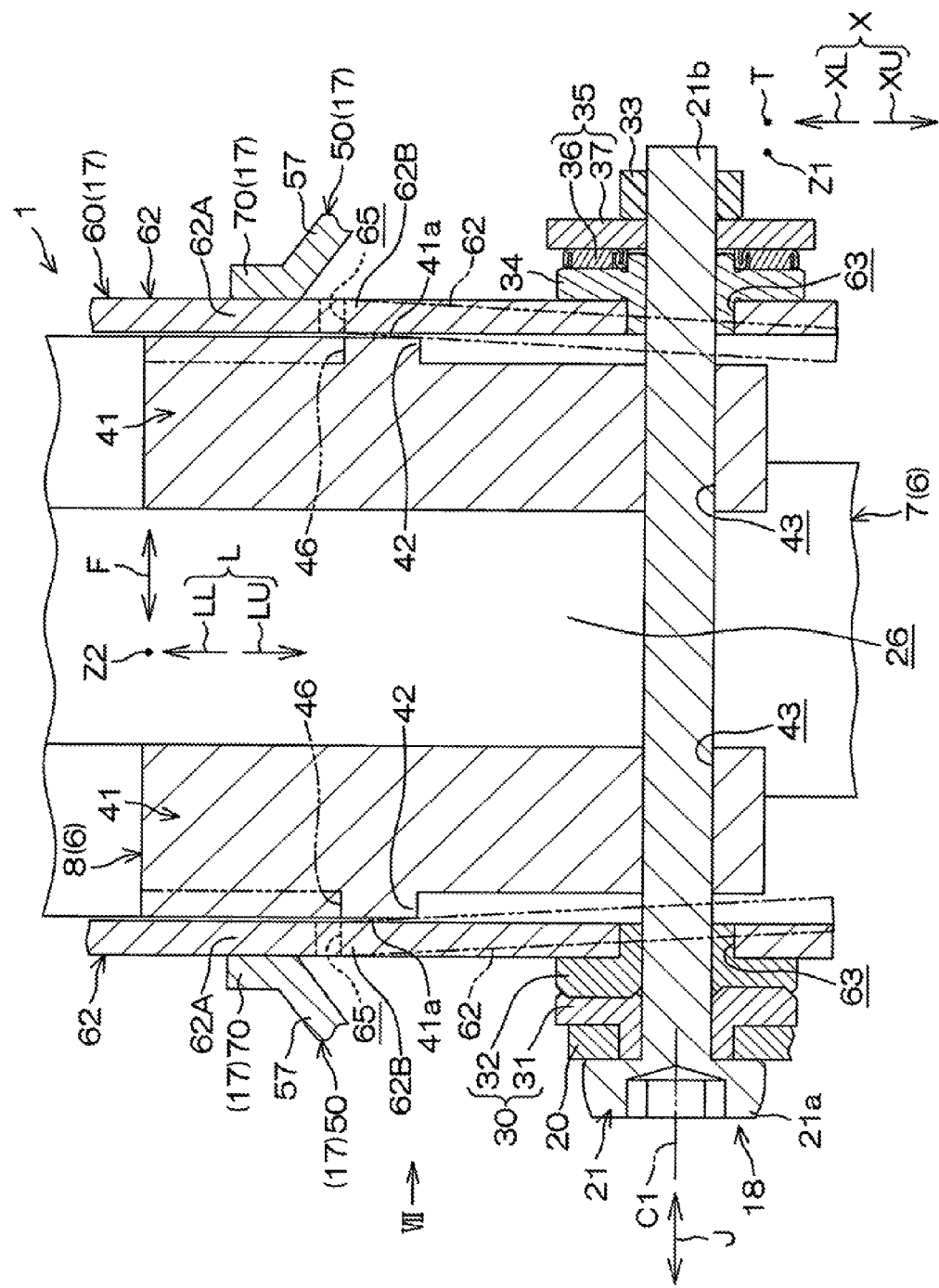
FIG. 6 is a schematic cross-sectional view taken along the line VI-VI in FIG. 2.
Figure 7:
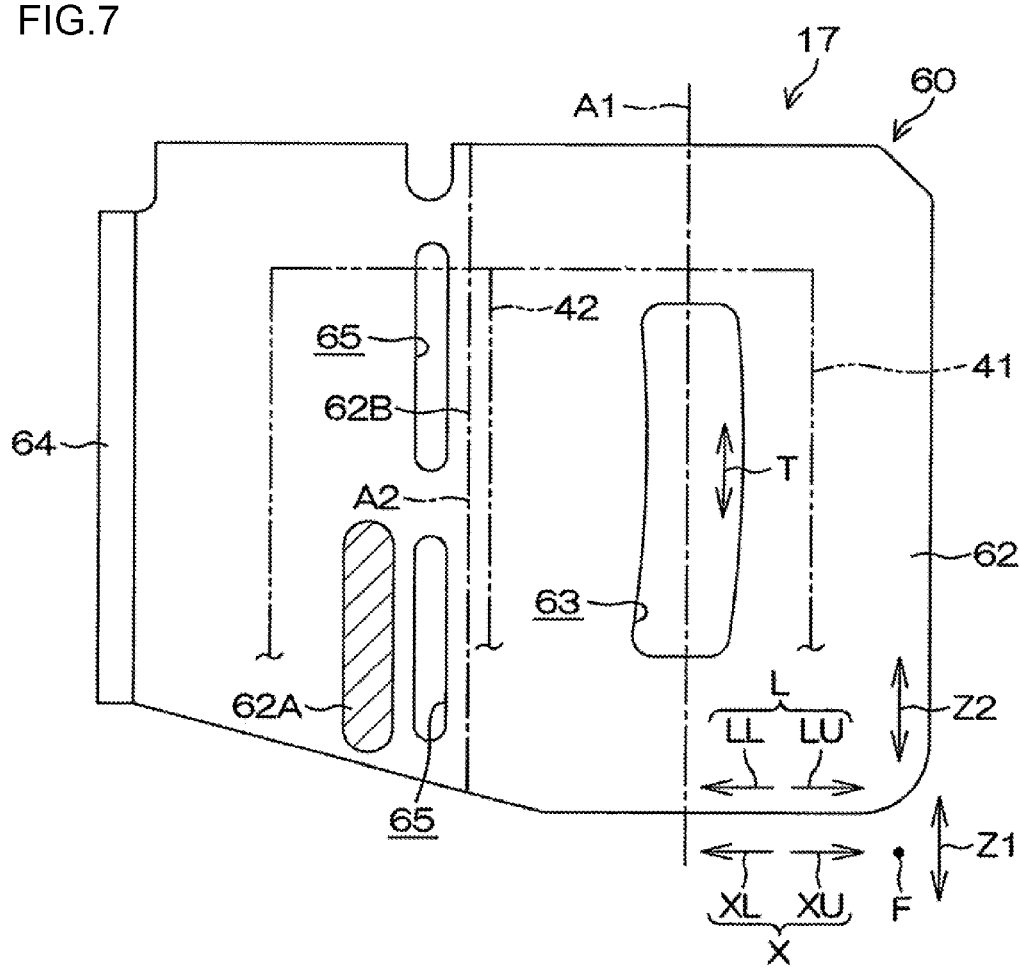
FIG. 7 illustrates a side plate as viewed from the arrow VII in FIG. 2.

Each reinforcing part 70 is located on the extending direction lower side LL with respect to the corresponding rigidity reduction portion 65. Accordingly, each reinforcing part 70 is located on the extending direction lower side LL with respect to the tilt groove 63. Each reinforcing part 70 is located on the extending direction upper side LU with respect to the center of the bolt insertion hole 51a of each fixing plate 51 in the extending direction L. FIG. 6 is a schematic cross-sectional view taken along the line VI-VI in FIG. 2. FIG. 7 illustrates the side plate 62 as viewed from the arrow VII in FIG. 2. In FIG. 7, elements other than the elastic deformation part 60 are not illustrated. In FIG. 7, the portion 62A of the side plate 62 that is coupled to the attachment part 50 by the reinforcing part 70 is indicated by hatching.

When clamped by the clamping mechanism 18, each side plate 62 of the elastic deformation part 60 is elastically deformed and bent such that an end of the side plate 62 on the extending direction upper side LU is displaced toward the corresponding facing portion 41. A portion that serves as a fulcrum when the side plate 62 is bent by being clamped by the clamping mechanism 18 is referred to as a fulcrum portion 62B. The fulcrum portion 62B includes a bending line A2 extending linearly in the vertical direction Z2.

Each of the side plates 62 is supported at the upper end in the vertical direction Z2 of a portion thereof on the extending direction lower side LL by the supported plate 61. Therefore, the upper portion in the vertical direction Z2 has a higher rigidity than the lower portion in the vertical direction Z2. Each reinforcing part 70 is located at the lower part of the corresponding side plate 62 in the vertical direction Z2. Therefore, the rigidity of the lower portion in the vertical direction Z2 is improved. Accordingly, the rigidity of the fulcrum portion 62B is uniform in the vertical direction Z2, and the bending line A2 is set to extend linearly in the vertical direction Z2.

Each stepped portion 42 of the outer jacket 8 is located between the corresponding fulcrum portion 62B and the corresponding tilt groove 63, in the extending direction L. Specifically, referring also to FIG. 7, each stepped portion 42 is located between a straight line A1 passing the center of the tilt groove 63 and extending in the vertical direction Z2 and the fulcrum portion 62B, in the extending direction L. More specifically, the distance between each stepped portion 42 and the corresponding straight line A1 in the extending direction L is greater than the distance between each stepped portion 42 and the corresponding fulcrum portion 62B (the bending line A2) in the extending direction L. In each side plate 62, the rigidity at a portion between the fulcrum portion 62B and the tilt groove 63 is higher than the rigidity at the end of the side plate 62 on the extending direction upper side LU.

According to the present embodiment, the clamping mechanism 18 clamps the side plates 62. Thus, each side plate 62 is bent such that the end of the side plate 62 on the first end 6a side (the extending direction upper side LU) is displaced toward the corresponding facing portion 41. The side plates 62 extend to the first end 6a side (the extending direction upper side LU) to intersect with the tilt direction T. Therefore, compared to the configuration in which the side plates 62 extend in the tilt direction T, the position where the side plates 62 are clamped by the clamping mechanism 18 is less easily changed in the extending direction L even when the clamping shaft 21 moves in the tilt grooves 63. Accordingly, it is possible to reduce the variation in the force (clamping force) of the clamping mechanism 18 clamping the side plates 62 in accordance with the position of the clamping shaft 21 in the tilt grooves 63. Thus, the clamping force can be stabilized.

Each stepped portion 42 at which the outer surface 41a of the corresponding facing portion 41 projects outward is located between the fulcrum portion 62B serving as a fulcrum when the side plate 62 is bent by being clamped by the clamping mechanism 18 and the tilt groove 63. Therefore, when each side plate 62 is bent by the clamping mechanism 18, a portion between the fulcrum portion 62B and the tilt groove 63, that is, a portion having a higher rigidity than the end of the side plate 62 on the first end 6a side (on the extending direction upper side LU) comes into contact with the stepped portion 42. The stepped portion 42 extends in the intersecting direction Z1 with respect to the column axial direction X. Therefore, compared to the configuration in which the stepped portion 42 extends in the column axial direction X, the stepped portion 42 comes into contact with the side plate 62 to have a wider contact area in the intersecting direction Z1 (for example, the entire area of the stepped portion 42 in the intersecting direction Z1). Accordingly, the side plate 62 can come into contact, at the portion having a relatively high rigidity, with the stepped portion 42 to have a relatively wide contact area, and hence the vibration rigidity can be improved. In the manner described above, the stepped portion 42 extends in the intersecting direction Z1, and serves as a positive contact that positively comes into contact with the side plate 62 when the side plate 62 is bent.

It is preferable that each stepped portion 42 is provided to extend from the upper end to the lower end of the outer surface 41a in the intersecting direction Z1. In this case, the stepped portion 42 can come into contact with the side plate 62 to have a wide contact area, regardless of the position of the column jacket 6 in the tilt direction T. However, as long as the stepped portion 42 can come into contact with the side plate 62 to have a wide contact area, the stepped portion 42 may be formed to extend intermittently in the intersecting direction Z1.

Each of the side plates 62 is reinforced, at the portion 62A of the side plate 62 on the extending direction lower side LL with respect to the tilt groove 63, by the reinforcing part 70. Therefore, the rigidity of the portion 62A of the side plate 62 is improved. Thus, the fulcrum portion 62B serving as a fulcrum when the side plate 62 is bent by being clamped by the clamping mechanism 18 is located on the extending direction upper side LU with respect to the reinforcing part 70. Accordingly, the position of the fulcrum portion 62B can be adjusted by adjusting the position of the reinforcing part 70.

Each rigidity reduction portion 65 for reducing the rigidity of the side plate 62 is located on the extending direction lower side LL with respect to the stepped portion 42. Therefore, a portion of the side plate 62 on the extending direction lower side LL with respect to the stepped portion 42 is easily bent. Accordingly, when the side plates 62 are clamped by the clamping mechanism 18, each side plate 62 is more easily brought into contact with the stepped portion 42. Each reinforcing part 70 is fixed by welding or the like to the portion 62A of the corresponding side plate 62 located on the extending direction lower side LL with respect to the rigidity reduction portion 65. Therefore, while the portion of the side plate 62 on the extending direction lower side LL with respect to the stepped portion 42 is easily bent, the portion on the extending direction lower side LL with respect to the rigidity reduction portion 65 is restricted from being bent. Accordingly, the position of the fulcrum portion 62B in the extending direction L is easily set to a desired position between the stepped portion 42 and the portion 62A of the side plate 62 that is located on the extending direction lower side LL with respect to the rigidity reduction portion 65.

Figure 8:
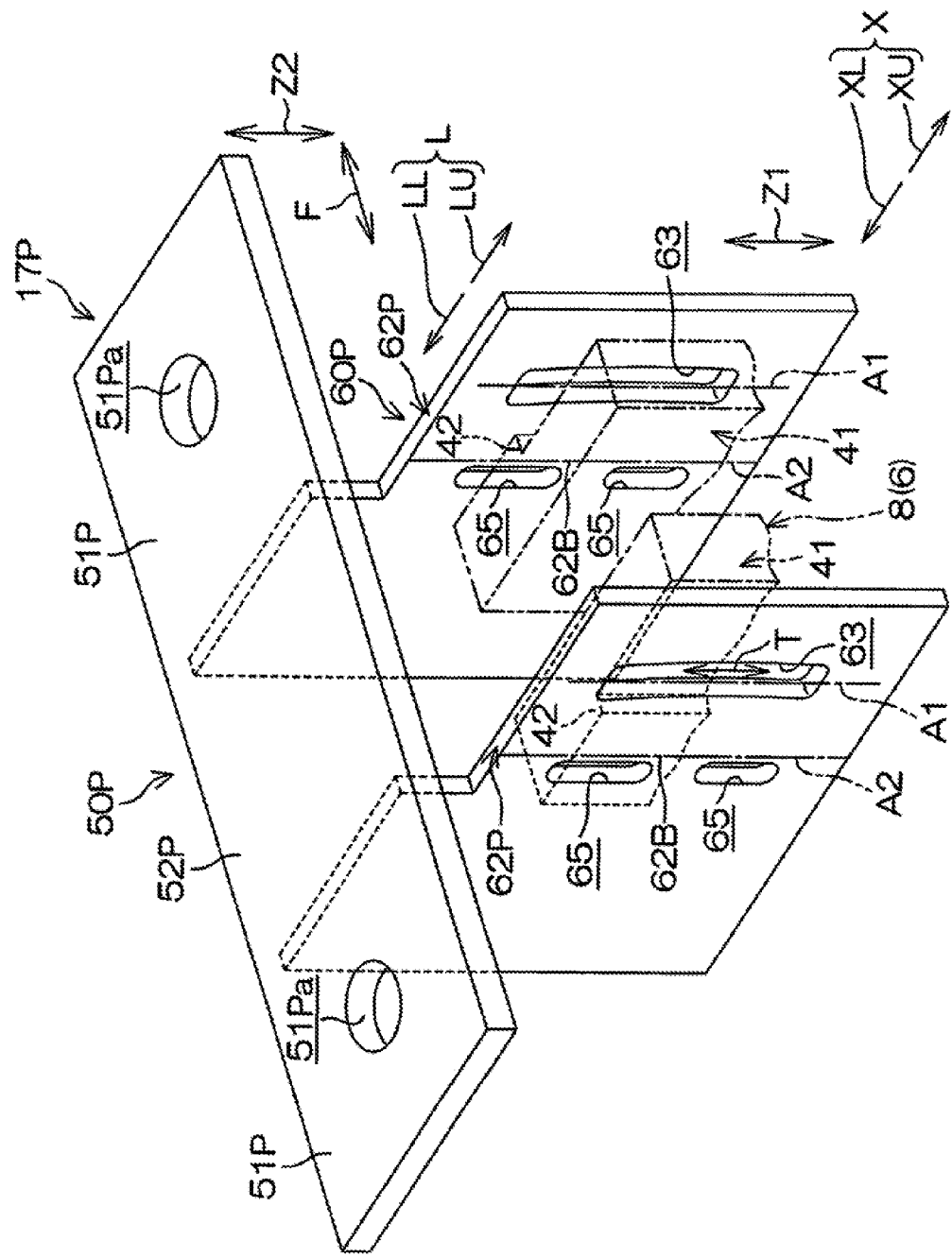
FIG. 8 is a perspective view illustrating an upper bracket according to a modification.

FIG. 8 is a perspective view illustrating an upper bracket 17P according to a modification of the above-described embodiment. In FIG. 8, the same elements as those described above are denoted by the same reference numerals, and the description thereof will be omitted. The upper bracket 17P according to this modification differs from the upper bracket 17 of the above-described embodiment mainly in that the upper bracket 17P is a member formed by fixing flat metal plate members to each other by welding or the like.

The upper bracket 17P includes an attachment part 50P and an elastic deformation part 60P. In place of the elastic deformation part 60 and the reinforcing parts 70, the attachment part 50P is attached to the vehicle body 13. The elastic deformation part 60P is elastically deformed by being clamped by the clamping mechanism 18. Unlike the attachment part 50 of the above-described embodiment, the attachment part 50P has the form of a flat attachment plate. That is, the attachment part 50P does not include the coupling plates 53 (see FIG. 3). The attachment part 50P includes a support plate portion 52P and a pair of fixing plate portions 51P. The support plate portion 52P supports the elastic deformation part 60P. The fixing plate portions 51P extend from the opposite ends of the support plate portion 52P in the facing direction F to the opposite outer sides of the support plate portion 52P, and are fixed to the vehicle body 13 (see FIG. 2). A bolt insertion hole 51Pa for inserting a bolt 54 that fixes the attachment part 50P to the vehicle body 13 is formed at the substantial center of each of the fixing plate portions 51P.

The elastic deformation part 60P includes a pair of side plates 62P supported by the opposite ends of the support plate portion 52P in the facing direction F and extending to the extending direction upper side LU. The side plates 62P may be symmetric with respect to a plane perpendicular to the facing direction F. In this case, the side plates 62P have the same rigidity. A tilt groove 63 extending in the tilt direction T is formed in each of the side plates 62P. A rigidity reduction portion 65 is provided in each side plate 62P. The rigidity reduction portion 65 is located on the axially lower side XL with respect to the stepped portion 42 and reduces the rigidity of the side plate 62P. Each stepped portion 42 of the outer jacket 8 is located between the corresponding fulcrum portion 62B and the corresponding tilt groove 63 in the extending direction L. Each stepped portion 42 is located between a straight line A1 passing the center of the tilt groove 63 and extending in the vertical direction Z2 and the bending line A2 of the fulcrum portion 62B, in the extending direction L. More specifically, the distance between each stepped portion 42 and the corresponding straight line A1 in the extending direction L is greater than the distance between each stepped portion 42 and the bending line A2 of the corresponding fulcrum portion 62B in the extending direction L.

According to this modification, similar effects to those of the above-described embodiment are achieved. The present invention is not limited to the above-described embodiment, and various modifications may be made within the scope of the appended claims.

For example, unlike the above-described embodiment, as indicated by the long dashed double-short dashed line in FIG. 6, each of the facing portions 41 may include a protruding portion 46 protruding from the outer surface 41a and extending in the intersecting direction Z1, and the stepped portion 42 may be defined by the axially upper end of the protruding portion 46. In this case, the outer surface 41a of the corresponding facing portion 41 projects outward from the facing portion 41 in the facing direction F at the axially upper end of the protruding portion 46 halfway from an axially upper end of the facing portion 41 to the axially lower side XL.

Unlike the above-described embodiment, the side plates 62 may have different rigidities (the same applies to the side plates 62P). In this case, the stepped portion 42 is provided for only one of the side plates 62 that has a lower rigidity. The side plates 62 have different rigidities in the case where the side plates 62 have different plate thicknesses t (see FIG. 2), for example.

According to this configuration, the stepped portion 42 is provided on only the facing portion 41 corresponding to one of the side plates 62 that has a lower rigidity. Therefore, the vibration rigidity around the side plate 62 having a lower rigidity can be improved. Accordingly, it is possible to reduce the variation in vibration rigidity on the whole, and improve the vibration rigidity. Further, it is possible to save time and trouble to provide a stepped portion 42 on the facing portion 41 corresponding to the side plate 62 having a higher rigidity.

Even in the case where the side plates 62 have the same rigidity, the stepped portion 42 may be provided for only one of the side plates 62. Each reinforcing part 70 does not necessarily have to be a coupling part that couples the portion 62A of the corresponding side plate 62 on the extending direction lower side LL with respect to the tilt groove 63 to the attachment part 50, and may be a block-shaped member or the like that is fixed to the portion 62A of the side plate 62 by welding or the like.

The steering system 1 may include a tilt lock mechanism (not illustrated) that firmly locks the position of the column jacket 6 in the tilt direction T and releases the position of the column jacket 6. The tilt lock mechanism may be provided on each of the side plates 62, or may be provided on only one of the side plates 62. The tilt lock mechanism includes first teeth (not illustrated) that are supported by the clamping shaft 21, and second teeth (not illustrated) that are supported by the side plate 62 and mesh with the first teeth. When the first teeth and the second teeth mesh with each other, the position of the column jacket 6 in the tilt direction T is firmly locked.

Unlike the above-described embodiment, the column jacket 6 may have a first end 6a on the side (lower front of the vehicle) opposite to the steering member 2 side and a second end 6b on the steering member 2 side (upper rear of the vehicle). In this case, the extending direction lower side LL is the first end 6a side in the extending direction L, and the extending direction upper side LU is the second end 6b side in the extending direction L. The side plates 62 of the upper bracket 17 extend from the opposite ends of the supported plate 61 in the facing direction F to the side opposite to the steering member 2 to intersect with the tilt direction T. When clamped by the clamping mechanism 18, each side plate 62 is bent such that an end of the side plate 62 at the lower front of the vehicle is displaced toward the corresponding facing portion 41.

The steering system 1 is not limited to the manual type steering system and may be an electric power steering system that applies the power of an electric motor to the steering shaft 3 to assist steering. Furthermore, various modifications may be made to the invention within the scope of the appended claims.

What is claimed is:

1. A steering system comprising:
   a column jacket pivotable in a tilt direction, the column jacket including
   a pair of facing portions protruding from an outer peripheral portion of the column jacket and facing each other, and
   a stepped portion which extends in an intersecting direction with respect to an axial direction of the column jacket and at which an outer surface of a corresponding one of the facing portions projects outward halfway from a first end side to a second end side of the column jacket in the axial direction;
   a bracket fixed to a vehicle body, the bracket including
   a pair of side plates disposed on outer sides of the respective facing portions and extending to the first end side to intersect with the tilt direction, and
   tilt grooves formed in the respective side plates and extending in the tilt direction; and
   a clamping mechanism that clamps the side plates to bend the side plates such that an end of each of the side plates on the first end side is displaced toward a corresponding one of the facing portions, the clamping mechanism including
   a clamping shaft that is inserted through the tilt grooves to move in the tilt direction in the tilt grooves when the column jacket pivots in the tilt direction;
   wherein the stepped portion is located between a portion serving as a fulcrum when a corresponding one of the side plates is bent by being clamped by the clamping mechanism and a corresponding one of the tilt grooves, in a direction in which the side plates extend.

2. The steering system according to claim 1, wherein:
   the side plates have different rigidities; and
   the stepped portion is provided on only the facing portion corresponding to one of the side plates that has a lower rigidity.

3. The steering system according to claim 1, wherein the bracket further includes reinforcing parts each disposed at a portion of a corresponding one of the side plates on the second end side with respect to the tilt groove, each of the reinforcing parts reinforcing the corresponding one of the side plates.

4. The steering system according to claim 1, wherein the bracket includes a rigidity reduction portion that reduces rigidity of a corresponding one of the side plates, the rigidity reduction portion being located on the second end side with respect to the stepped portion.

* * * * *